United States Patent
Wang

(10) Patent No.: US 6,224,975 B1
(45) Date of Patent: May 1, 2001

(54) PRESSURE SENSITIVE ADHESIVE TAPE ARTICLE WITH AN ANTI-STATIC COATING

(75) Inventor: Yongzhong Wang, W. Warwick, RI (US)

(73) Assignee: Arkwright, Incorporated, Fiskeville, RI (US)

( * ) Notice: Subject to any disclaimer, the term of this patent is extended or adjusted under 35 U.S.C. 154(b) by 0 days.

(21) Appl. No.: 09/222,680

(22) Filed: Dec. 29, 1998

Related U.S. Application Data

(60) Provisional application No. 60/071,725, filed on Dec. 30, 1997.

(51) Int. Cl.$^7$ ................... C09J 7/02; B32B 7/12
(52) U.S. Cl. ............... 428/354; 428/922; 428/480; 428/353; 428/192; 428/343
(58) Field of Search .................. 428/922, 354, 428/480, 483, 334, 353, 343, 355 AC, 192

(56) References Cited

U.S. PATENT DOCUMENTS

| | | | |
|---|---|---|---|
| 4,074,000 | * | 2/1978 | Hankee et al. ............ 428/323 |
| 4,981,544 | * | 1/1991 | Nordale ................. 156/252 |
| 5,491,013 | | 2/1996 | Holley . |
| 5,637,368 | * | 6/1997 | Cadalbert et al. ......... 428/40.1 |
| 5,736,228 | * | 4/1998 | Morris et al. ............ 428/195 |

FOREIGN PATENT DOCUMENTS

| | | |
|---|---|---|
| 695973A1 | 2/1996 | (EP) . |
| 07281420 | 10/1995 | (JP) . |

OTHER PUBLICATIONS

European Search Report dated Apr. 20, 1999.

* cited by examiner

Primary Examiner—Daniel Zirker
(74) Attorney, Agent, or Firm—Birch, Stewart, Kolasch and Birch, LLP

(57) ABSTRACT

An opaque pressure sensitive adhesive (PSA) sheet or tape article, which comprises an anti-static coating on one side of a polymeric base film and an adhesive coating on the other side of the base film which can be opaque or transparent. If the base film is transparent, an opaque adhesive is coated onto the film to make it opaque. However, a clear adhesive can be coated onto the base film to make an opaque pressure sensitive adhesive tape if the base film itself is opaque. The total thickness of the pressure sensitive-tape ranges from about 0.4 mil to about 1.8 mil with a base film thickness no greater than about 1.4 mil. The pressure sensitive tape should have an opacity of greater than or equal to about 70%. The resistivity of the prepared sheet having an anti-static coating layer thereon should not be larger than about $10^{12} \Omega/SQ$.

7 Claims, 1 Drawing Sheet

PRESSURE SENSITIVE ADHESIVE TAPE ARTICLE WITH AN ANTI-STATIC COATING

This application claims priority on provisional application Ser. No. 60/071,725 filed on Dec. 30, 1997, the entire contents of which are hereby incorporated by reference.

FIELD OF THE INVENTION

The instant invention relates to repositionable or removable pressure sensitive adhesive sheet or tape articles, which contain an anti-static coating layer.

BACKGROUND OF THE INVENTION

Transparent sheets have been commonly used in copiers and printers to make imaged sheets for presentations. Most copiers or printers have optical sensing devices to detect the incoming sheets. However, transparent sheets can not be detected by optical sensors in these machines. In order to use transparent sheets in these machines, several methods have been employed to solve this problem.

One common used method is to adhere a piece of paper to a transparent sheet by a thin line of adhesive. After the transparent sheet is imaged, the operator has to remove the paper from the transparent sheet. However, the paper backing (usually 3 to 4 mil thick) insulates the transparency sheet from close contact with the heated fuser. This may result in insufficient heating of toners on the transparent sheet, and therefore also result in poor image quality.

The second method employed is to apply an opaque ink stripe along one edge of a transparent film as disclosed in U.S. Pat. 5,126,762. The opaque ink stripe allows the machines to determine the incoming transparent sheets, and overcome the problem of an insufficient heating of toners on the transparent sheet (film). But the ink stripes are not removable after imaging and leave visible marks during presentation.

The third method used is to employ a repositionable paper pressure sensitive adhesive (PSA) stripe onto one edge of the transparent sheet, wherein the operator peels off the paper PSA stripe from the transparent sheet after imaging. This allows for a full view of the imaged transparent sheet during the presentation. The paper PSA stripes are usually thick (2 to 4 mils). The edge portion of the transparent sheet with a paper PSA stripe is much thicker than the edge portion of the transparent sheet without the paper stripe. When a large number of sheets are put into a feeding tray, the thickness difference between the two edges of the transparent sheets results in a slope-like shape for the stack of transparent sheets. This limits the number of sheets which can be stacked at one time.

The fourth method is to use a thin plastic PSA stripe on the transparent sheets as disclosed in European patent EP 0 695 973 A1. The plastic PSA stripe article comprises an opaque coating ($TiO_2$) on one side of a clear plastic stripe to render it the desirable opacity and an adhesive coating on the other side of the plastic stripe to give it the required adhesion to the transparent sheet. The plastic PSA stripes are much thinner than paper PSA stripes. With these stripes on the transparent sheets, many more sheets of transparent sheets can be stacked in the feeding tray of copiers and printers.

Each of the above methods serves its purpose. The thin plastic PSA stripe clearly is of advantage over paper PSA stripes. In the plastic PSA stripe disclosed in European patent EP 0 695 973 A1, opacity of the stripe is controlled by an opaque coating on the transparent plastic base stripe. The opaque coating should have sufficient thickness to give the desired opacity. This adds to the total thickness of the plastic adhesive stripe. It would be of-advantage to use an opaque plastic base stripe which will give the desired opacity. Also, it is found that the poor anti-static property of the plastic PSA stripes affects the feeding of the transparent sheets and causes jams of transparent sheets in a copier.

It has been found by the present inventor that transparent sheets bearing untreated plastic PSA stripes can be used in black and white copiers sometimes. However, they will jam in color copiers because they are exposed to a static environment in a color copier longer than they are in a black and white copier. It has also now been found by the present inventor that an anti-static coating on the opaque plastic stripes used on transparent sheets improved sheet feeding, while also increasing the number of sheets that can be stacked in a feeding tray at the same time. Furthermore, a rough anti-static coating gives the plastic PSA stripe the paper-like properties such as sufficient friction coefficient which will allow the machine to move the transparent sheet in and out of a copier or a printer. Likewise, though corona treatment can also generate an anti-static property on a polymeric plastic stripe, the present inventor has discovered that this kind of anti-static property will dissipate over time, thereby affecting the long term usefulness of the polymeric plastic PSA stripes on the transparent sheets.

BRIEF SUMMARY OF THE INVENTION

The present invention provides pressure sensitive adhesive (PSA) stripes for transparent sheets used in copying and printing devices. The opaque plastic PSA stripes can be applied onto an edge of transparent sheets to allow them to be used in copiers or printers with optical sensors. The opaque PSA stripe can be easily removed after imaging so that the imaged transparent sheet has no dark line or area when projected during presentation.

Specifically, the plastic PSA stripe comprises an anti-static coating on one side of the opaque plastic base stripe and an adhesive coating on the other side. The plastic base film used to form the PSA stripes should have a thickness of from about 0.4 mil to about 1.4 mil, preferably around about 1 mil (25.4 $\mu$m). The PSA stripe should have a total thickness of from about 0.5 mil to about 3.5 mil, preferably about 1.2 to about 1.4 mil.

The opaque polymeric PSA stripes should have an opacity of greater than or equal to about 70%, and have sufficient tensile strength to sustain heating when the transparent sheet with the PSA stripe goes through a copier. The polymeric base film can be an opaque plastic film or a transparent plastic film. In the case of a transparent plastic base film, an opaque adhesive can be used to form an opaque PSA stripe. The opaque adhesive composition should be applied to the base film in a thick enough layer to give the PSA stripe its required opacity.

In order to improve the adhesion between anti-static coating and polymeric base film and between the pressure sensitive adhesive layer and the polymeric base film, a primer coating can be applied onto the base film prior to applying the anti-static coating layer and/or the adhesive coating layer.

The adhesive can be a water-based or solvent-based acrylate, polyester, or rubber adhesive with high sheer strength and low peel strength (i.e., a pressure sensitive adhesive). Since the transparent sheets are usually coated with an ink or a toner receptive coating, the adhesive coating on the PSA stripe could interact with the ink or toner receptive coating on the transparent sheets during imaging at elevated temperature. This interaction would result in residue or no removability when the PSA stripe is to be peeled off after imaging. In order to overcome this problem, a cross-linking agent can be added to the adhesive to further increase its sheer strength and decrease its peel strength.

BRIEF DESCRIPTION OF THE DRAWINGS

The present invention will become more fully understood from the detailed description given hereinbelow and the accompanying drawings, which are given by way of illustration only, and thus are not limitative of the present invention, and wherein.

Figure 1:
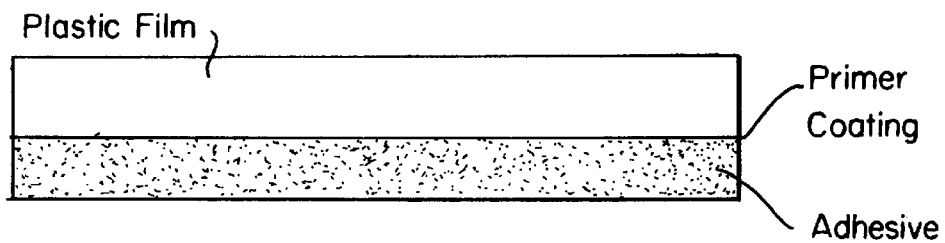
FIG. 1 provides a schematic diagram of an opaque pressure sensitive stripe having a primer coating and an overcoat of a pressure sensitive adhesive on a surface thereof.

Further scope of applicability of the present invention will become apparent from the detailed description given hereinafter. However, it should be understood that the detailed description and specific examples while indicating preferred embodiments of the invention, are given by way of illustration only, since various changes and modifications within the spirit and scope of the invention will become apparent to those skilled in the are from the detailed description.

DETAILED DESCRIPTION OF THE INVENTION

This invention describes the use of an anti-static coating on an opaque plastic PSA stripe to form an unique PSA stripe for transparent imaging sheets. The PSA tapes or sheets with an anti-static coating could also be used as electronic packaging tapes or protective sheets.

The polymeric base film should have enough tensile strength and heat resistance and low shrinkage during heating. The polymeric base film is selected from, but not limited to polyolefins such as polyethylene and polybutylene, polystyrene, polyesters such as polyethylene terephthalate (PET), polymethylmethacrylate, cellulose acetate, polyvinylchloride and polyvinylidene fluoride, polyamides and polyimides and their opaque varieties. Opaque or transparent PET films are highly preferred.

The thickness of the polymeric base film ranges from about 0.4 mil to about 1.4 mil, and is preferably about 0.92 mil. The adhesive layer should have a thickness ranging from about 0.1 mil to about 0.5 mil, preferably from about 0.2 mil to about 0.4 mil. The total thickness of the PSA stripe should have a thickness ranging from about 0.6 mil to about 1.8 mil, preferably from about 1.2 to about 1.4 mil.

It is preferred to treat one or both surfaces of the base polymeric film sheet with an adhesion promotion coating for better adhesion to the anti-static coating and the adhesive coating. The treatment can be done by the base film suppliers or by applying a primer coating prior to applying an anti-static coating and adhesive coating to respective sides of the base polymeric sheet. Suitable and acceptable primer coating materials can be chosen from silane coupling agents, polyester emulsions and aqueous polyurethane, preferably the primer coating material is an aqueous based polyurethane material with cross-linking agents.

The opacity of the PSA stripe is achieved by selecting an opaque plastic base film with sufficient opacity or by applying pigment filled adhesive to the transparent plastic base film. The opacity of the PSA stripe should be greater than 70%.

For a transparent base film, an opaque adhesive is needed to give the PSA stripe the required opacity. The preferred pigments include titanium dioxide, calcium carbonate and other inorganic fillers. With pigment-filled adhesives, the opacity of the PSA stripe is controlled by the thickness of the adhesive layer and the pigment to adhesive ratio. The pigment to adhesive ratio is preferably around about 1. High pigment to adhesive ratio in the opaque adhesive composition tends to give low adhesion, while lower pigment to adhesive ratio tends to risk losing the required opacity and giving high adhesion.

The adhesive can be chosen from a variety of aqueous or solvent-based adhesives including acrylates, rubbers and polyesters, preferably aqueous acrylates such as ROBOND PS95N, ROBOND PS20, ROBOND PS60 (Rohm & Haas Co.), ACRONAL 3432, ACRONAL 81D (BASF), VALTAC 56, FLEXCRYL 638, ACP series emulsions (Air Products). The preferred adhesive should have high sheer strength and low peel strength. Most of the commercially available adhesives have higher than the required adhesion for removable PSA stripe for the transparent sheets. A cross-linking agent is added to the adhesive to increase its cohesive strength and decrease its peel strength.

The cross-linking agents can be chosen from inorganic cross-linking agents such as multivalent metal salts (U.S. Pat. No. 3,740,366, U.S. Pat. No. 3,900,610 and U.S. Pat. No. 3,770,780) and organic cross-linking agents such as epoxies, amides, amines and polyfunctional aziridines (U.S. Pat. No. 3,563,953, U.S. Pat. No. 3,886,126, U.S. Pat. No. 3,575,911 and EU Patent 0 695 973 A1), preferably polyfunctional aziridines.

The anti-static agents can be chosen from a variety of anti-static agents such as amines, glycerol esters, quaternary ammonium compounds, anionics and inorganic particles. The binders for the anti-static coating can be aqueous polymeric resins with good adhesion to polymeric base films, such as plastic films.

Several examples (Example 1–5) of the plastic PSA tapes without anti-static coatings are also included in this application to show that without anti-static coatings, such products possessed poor feedability. The PSA products (e.g., tapes) with anti-static coatings showed much better feedability in copiers, especially in color copiers.

The following examples are for illustrative purposes only, and are not meant to be limiting. One skilled in the art will easily think of variations within the scope of the invention, which is solely defined by the claims.

In the following Examples, various tradenames are used to denote certain ingredients used to prepare the inventive articles, and include the following:

ACRONAL 3432 and ACRONAL 81D: acrylic polymer dispersions available from BASF.

CRAIGSTIK 3991 PIHT: acrylic microsphere adhesive available from Craig Adhesives and Coatings Company.

CYASTAT 609: quaternary ammonium compound available from American Cyanimid.

MICRAL 632: aluminum trihydrate powder available from J. M. Huber Corp.

NV-7003: titanium dioxide available from Daniel Products.

PLASTILIT 3060: polypropylene glycol alkyl phenyl ether (a plasticizer), BASF.

PLIOLITE WR-D: styrene acrylate water dispersion, Eastman Chemical.

RHOPLEX AC73T: acrylic emulsion.

ROBOND PS 95 N, PS20, and PS60: acrylic pressure sensitive adhesive, Rhohm and Haas.

SANCURE 1301: polyurethane dispersion.

VALTAC 56: acrylic emulsion (a PSA), Air Products Company.

VERSA TL 502: polystyrene sulfonic acid (anti-static agent), Nathional Starch and Chemical Co.

XAMA 7: polyfunctional aziridine, BF Goodrich.

EXAMPLE 1

An opaque PSA stripe was formed having the structure shown in FIG. 1. The plastic film is a clear PET film (0.92 mil, ICI). The PET film was primer coated with diluted SANCURE 1301 (BF Goodrich) by reverse roll. The diluted SANCURE 1301 was formed from a mixture of 20 kg of water and 30 kg of SANCURE 1301.

An opaque adhesive was formed as follows: 0.2 kg of XAMA-7 (Ethylenimine Technology, Inc.) was dissolved in 2.6 kg of water by mixing them together. 19.2 kg of ROBOND PS-95N (Rohm & Haas Co.,), 16.0 kg of NV-7003 (Daniel Products Co.) and 2.0 kg of PLASTILIT 3060 (BASF Corp.) were then added to the water solution of XAMA-7 and mixed together for 40 minutes.

A 0.92 mil transparent PET film was primer coated with the diluted SANCURE 1301 mentioned above by a reverse roll coating method. The drying temperature was set at 230° F. for 30 feet long oven. The coating speed was 50 feet per minute (FPM). The opaque adhesive mentioned above was then coated with a reverse roll coating method onto the primered transparent PET film (ICI) with the same coating condition as the primer coating. The opacity of the pressure sensitive adhesive sheet was measured with BNL-3 Opacimeter (Technidyne Corporation, New Albany, Ind.)

The opaque PSA film was slit to 0.75 inch width in the machine direction. The 0.75 inch wide PSA tape was then laminated onto ARKWRIGHT transparent film (XEROX UltraClear 214) and further slit into 0.385 inch width PSA stripe on the transparent sheets. The imaging test were performed by bypass mode on XEROX 5760 Color Copier, and the test results are listed in Table 1.

EXAMPLE 2

An opaque PSA stripe was formed as the same way as in Example 1, but with a different adhesive thickness. The test results are listed in Table 1.

EXAMPLE 3

An opaque PSA stripe was formed in the same way as in Example 1, except that the adhesive has the following composition: 0.3 kg of XAMA-7 (Ethylenimine Technology, Inc.), 2.5 kg of water, 18.4 kg of ROBOND PS-95N (Rohm & Haas Co.), 16.4 kg of NV-7003 (Daniel Products Co.) and 2.4 kg of PLASTILIT 3060 (BASF Corp.). The test results are listed in Table 1.

EXAMPLE 4

An opaque PSA stripe was formed in the same way as in Example 3, but with a different adhesive thickness. The test results are listed in Table 1.

EXAMPLE 5

An opaque PSA stripe was formed in the same way as Example 1, except that the base polymer film is an opaque PET film (0.92 mil, ICI), and the adhesive was formed as follows: 0.28 kg of XAMA-7 was dissolved in 3.32 kg of water. 10.8 kg of CRAIGSTIK 3991 PIHT (Craig Adhesives and Coatings Co.) and 25.6 kg of ACRONAL 3432 (BASF Corp.) were then added to the water solution of XAMA-7 and mixed together for 40 minutes to form a clear adhesive. The test results are listed in Table 1.

TABLE 1

| | Example 1 | Example 2 | Example 3 | Example 4 | Example 5 |
|---|---|---|---|---|---|
| Pet Base Film | Trans. | Trans. | Trans. | Trans. | Opaque |
| Adhesive Stripe Thickness (mil) | Opaque 1.3 | Opaque 1.5 | Opaque 1.4 | Opaque 1.3 | Clear 1.8 |
| Stripe Opacity (%) | 82 | 86 | 88 | 81 | 77.5 |
| Residue Feeding Quality | Light 3 Sheets | Light 2 Sheets | Light 1 sheet | Light 1 Sheet | None Stripe Off |
| Image Quality | Good | Good | Good | Good | — |

EXAMPLE 6

Figure 2:
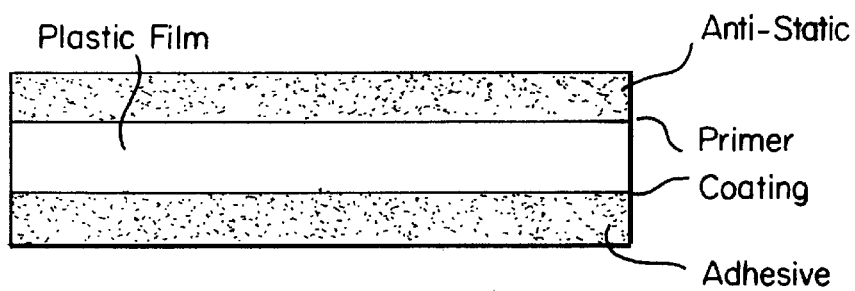
FIG. 2 provides a schematic diagram of an opaque pressure sensitive stripe with a primer coating layer and an overlayer of an anti-static coating on one side of a polymeric base sheet, and a primer coating layer and an overlayer of a pressure sensitive adhesive on another side of the polymeric base sheet.

An opaque PSA stripe was formed having the structure shown in FIG. 2.

A primer coating was formed as follows: 0.54 kg of XAMA-7 was dissolved in 10.71 kg of water. 0.18 kg of PnB solvent (Dow Chemicals) and 3.57 kg of SANCURE 1301 were then added to the water solution of XAMA-7 and mixed together for 30 minutes to form the primer coating composition. The primer coating was coated by a #6 Mayer rod method on both sides of a 0.92 mil clear PET film (ICI). The drying temperature in three ovens are all 250° F. The total length of the ovens is 30 feet (10 feet for each oven). The line speed (coating speed) was 30 FPM. The coat weight of the primer coating is 2.0 g/m$^2$.

An anti-static coating is formed as follows: 0.18 kg of PnB Solvent (Dow Chemical Co.), 11.51 kg of water, 3.04 kg of RHOPLEX AC73T (Rhom & Haas Co.), 0.21 kg of UltraClear PPC Grind (ARKWRIGHT, Inc.), and 0.06 kg of CYASTAT 609 (American Cyanamide) were mixed together for 30 minutes to form an anti-static coating composition.

The anti-static coating was applied to the primered clear PET base film (0.92 mil, ICI) with a #10 Mayer rod as the conditions mentioned above for the primer coating. The coat weight for the anti-static coating is 0.97 g/m$^2$. The resistivity of the coating is $6 \times 10^{10} \Omega/SQ$ and it is measured on a 6105 Resistivity Adapter (Keithley Instruments, Inc., Cleveland, Ohio).

An adhesive was formed as follows: 0.36 kg of XAMA-7, 3.24 kg of water, 20.40 kg of ROBOND PS-95N, 14.40 kg of NV-7003, and 1.60 kg of PLASTILIT 3060 were mixed together for 40 minutes to form an opaque adhesive. The adhesive coating was applied to the primered PET film with a #12 Mayer rod and dried under the same conditions as the primer coating. The coat weight for the adhesive coating is 12.8 g/m$^2$.

The PSA film was slit into 0.75 inch width. The 0.75 inch wide PSA tape was then laminated onto ARKWRIGHT transparencies (XEROX UltraClear 214) and further slit into 0.385 inch width PSA stripe on the transparent sheets. Two hundred of the transparent sheets with the PSA stripes were loaded into a XEROX 1090 black and white copier. The sheets fed without any jams and imaged reliably.

EXAMPLE 7

An opaque PSA stripe was formed in the same way as in Example 6, except that the anti-static coating was formed as follows: 8.16 kg of water, 0.09 kg of VERSA TL 502 (National Starch and Chemicals Co.), 2.25 kg of MICRAL 632 (J.M. Huber Corp.) and 4.50 kg of PLIOLITE WR-D (Goodyear Chemicals, Inc.) were mixed together for 40 minutes to form the anti-static coating composition. The anti-static coating was coated with a #6 Mayer rod to the primered clear PET film (0.92 mil, ICI). The coat weight for the anti-static coating is 2.9 g/m$^2$. The resistivity of the coating is $1.6 \times 10^{11} \Omega$/SQ.

The PSA film was slit into 0.385 inch width and laminated onto ARKWRIGHT transparencies (XEROX UltraClear 214). 50 sheets of the transparencies were fed and imaged well on a XEROX 1090 copier.

EXAMPLE 8

An opaque PSA stripe was formed having the structure shown in FIG. 2. The polymer base film is an opaque PET film. The primer and anti-static coatings are applied to the PET base film as the same way as in Example 6. However, the adhesive was formed as follows: 0.30 kg of XAMA-7 was dissolved in 2.70 kg of water. 12.0 kg of ROBOND PS-20 (Rhom and Haas Co.) was then added to the water solution of XAMA-7 and mixed together for 30 minutes to form the clear adhesive.

The adhesive was coated on the primered PET film with a #10 Mayer rod under the same conditions as the primer and anti-static-coatings. The resistivity of the anti-static coating is $6 \times 10^{10} \Omega$/SQ.

The PSA film was slit into 0.385 inch width and laminated onto ARKWRIGHT transparencies (XEROX UltraClear 214). 50 sheets of the transparencies were fed and imaged well on a XEROX 1090 copier.

EXAMPLE 9

An opaque PSA stripe was formed having the structure shown in FIG. 2. The polymer base film is an opaque PET film. The primer and adhesive coatings are applied to the PET base film in the same way as in Example 8. However, the anti-static coating was formed as follows: 8.16 kg of water, 0.09 kg of VERSA TL 502 (National Starch and Chemicals Co.), 2.25 kg of MICRAL 632 (J.M. Huber Corp.) and 4.50 kg of PLIOLITE WR-D (Goodyear Chemicals, Inc.) were mixed together for 40 minutes to form the anti-static coating composition. The resistivity of the anti-static coating is $1.6 \times 10^{11} \Omega$/SQ.

The PSA film was slit into 0.385 inch width and laminated onto ARKWRIGHT transparencies (XEROX UltraClear 214). 50 sheets of the transparencies were fed and imaged well on a XEROX 1090 copier.

EXAMPLE 10

An opaque PSA tape article was constructed having the structure shown in FIG. 2. A primer coating was formed as follows: 9.0 kg of SANCURE 1301 and 6.0 kg of water were mixed together for 30 minutes to form the primer coating composition. The primer coating was coated by a #5 Mayer rod method on both sides of a 0.92 mil opaque PET film (ICI). The drying temperature in three ovens are 250, 200 and 200° F. The total length of the ovens is 30 feet (10 feet for each oven). The line speed (coating speed) was 50 FPM. The coat weight of the primer coating is about 1.0 g/m$^2$.

An anti-static coating is formed as follows: 7.065 kg of water, 0.03 kg of VERSA TL 502, 1.155 kg of MICRAL 632, 0.345 kg of Neptune SST2-SP5, 0.09 kg of Non Skid 5389 and 6.165 kg of PLIOLITE WR-D were mixed together for 30 minutes to form an anti-static coating composition. The resistivity of the anti-static coating is $4 \times 10^{11} \Omega$/SQ.

The anti-static coating was applied to the primered opaque PET base film (0.92 mil, ICI) with a #5 Mayer rod under the conditions mentioned above for primer coating.

The coat weight for the anti-static coating is about 2.6 g/m$^2$.

An adhesive was formed from the following: 0.135 kg of XAMA-7 was dissolved in 2.265 kg of water, 12.6 kg of ROBOND PS-20 was then added to the water solution of XAMA-7 and mixed them together for 30 minutes to form a clear adhesive. The adhesive coating was applied to the primered PET film with a #4 Mayer rod and with the same conditions for primer coating. The coat weight for adhesive coating is 3.3 g/m$^2$.

The PSA film was slit into 0.75 inch width. The 0.75 inch wide PSA tape was then laminated onto ARKWRIGHT transparencies (XEROX UltraClear 214) and further slit into 0.385 inch width PSA stripe on the transparent sheets. 50 transparent sheets with the PSA stripes were loaded into a XEROX 1090 black and white copier. The sheets fed without any jams and imaged reliably.

EXAMPLE 11

An opaque PSA tape article was constructed having the structure shown in FIG. 2. The primer and anti-static coatings were coated to the opaque PET film the same way as in Example 10. The adhesive coating had the same composition as that in Example 10. However, the adhesive coating was applied to the base film with a #6 Mayer rod. The coat weight for the adhesive coating was 4.6 g/m$^2$.

The PSA film was slit into 0.75 inch width. The 0.75 inch wide PSA tape was then laminated onto ARKWRIGHT transparencies (XEROX UltraClear 214) and further slit into 0.385 inch width PSA stripe on the transparent sheets. 50 transparent sheets with the PSA stripes were loaded into a XEROX 1090 copier. The sheets fed without any jams and imaged reliably.

EXAMPLE 12

An opaque PSA tape article was constructed having the structure shown in FIG. 2. The primer and anti-static coatings were coated to the opaque PET film the same way as in Example 10. The adhesive coating had the same composition as that in Example 10. However, the adhesive coating was applied to the base film with a #8 Mayer rod. The coat weight for the adhesive coating was 5.1 g/m$^2$.

The PSA film was slit into 0.75 inch width. The 0.75 inch wide PSA tape was then laminated onto ARKWRIGHT transparencies (XEROX UltraClear 214) and further slit into 0.385 inch width PSA stripe on the transparent sheets. 50 transparent sheets with the PSA stripes were loaded into a XEROX 1090 black and white copier. The sheets fed without any jams and imaged reliably.

EXAMPLE 13

Figure 3:
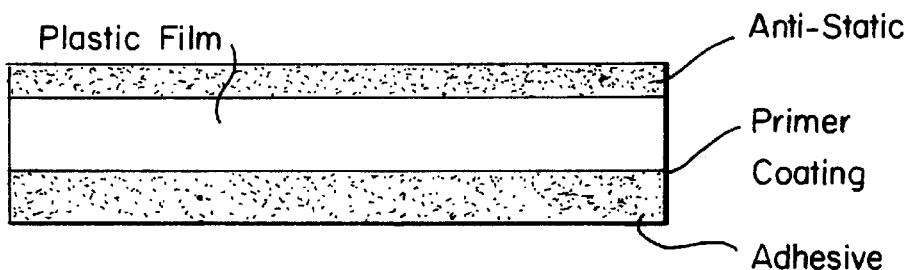
FIG. 3 provides a schematic diagram of an opaque pressure sensitive stripe with an anti-static coating on one side of the polymeric base sheet, and a primer coating layer and an overlayer of a pressure sensitive adhesive on another side of the polymeric base sheet.

An opaque PSA tape article was constructed having the structure shown in FIG. 3. The primer coating, anti-static coating and adhesive coating were applied to the PET film in the same way as in Example 6, except that there was no primer coating under the anti-static coating.

The PSA film was slit into 0.75 inch width. The 0.75 inch wide PSA tape was then laminated onto ARKWRIGHT transparencies (XEROX UltraClear 214) and further slit into 0.385 inch width PSA stripe on the transparent sheets. 50 transparent sheets with the PSA stripes were loaded into a XEROX 1090 black and white copier. The sheets fed without any jams and imaged reliably.

EXAMPLE 14

An opaque PSA tape article was constructed having the structure shown in FIG. 3. The primer coating, anti-static coating and adhesive coating were applied to the PET film in the same way as described in Example 8, except that there was no primer coating under the anti-static coating.

The PSA film was slit into 0.75 inch width. The 0.75 inch wide PSA tape was then laminated onto ARKWRIGHT transparencies (XEROX UltraClear 214) and further slit into 0.385 inch width PSA stripe on the transparent sheets. 50 transparent sheets with the PSA stripes were loaded into a XEROX 1090 black and white copier. The sheets fed without any jams and imaged reliably.

EXAMPLE 15

An opaque PSA tape article was constructed having the structure shown in FIG. 3. The primer coating, anti-static coating and adhesive coating were applied to the PET film in the same way as described in Example 8, except that there was no primer coating under the anti-static coating.

The PSA film was slit into 0.75 inch width. The 0.75 inch wide PSA tape was then laminated onto ARKWRIGHT transparencies (XEROX UltraClear 214) and further slit into 0.385 inch width PSA stripe on the transparent sheets. 50 transparent sheets with the PSA stripes were loaded into a XEROX 1090 black and white copier. The sheets fed without any jams and imaged reliably.

EXAMPLE 16

An opaque PSA tape article was constructed having the structure shown in FIG. 3. The primer coating, anti-static coating and adhesive coating were applied to the PET film as the same way in Example 9, except that there was no primer coating under the anti-static coating.

The PSA film was slit into 0.75 inch width. The 0.75 inch wide PSA tape was then laminated onto ARKWRIGHT transparencies (XEROX UltraClear 214) and further slit into 0.385 inch width PSA stripe on the transparent sheets. 50 transparent sheets with the PSA stripes were loaded into a XEROX 1090 black and white copier. The sheets fed without any jams and imaged reliably.

EXAMPLE 17

An opaque PSA tape article was constructed having the structure shown in FIG. 3.

A primer coating was formed as follows: 0.54 kg of XAMA-7 was dissolved in 10.71 kg of water. 0.18 kg of PnB solvent (Dow Chemicals) and 3.57 kg of SANCURE 1301 were then added to the water solution of XAMA-7 and mixed together for 30 minutes to form the primer coating composition. The primer coating was coated by a #6 Mayer rod method on both sides of a 0.92 mil clear PET film (ICI). The drying temperature in three ovens are 275, 275 and 250° F. The total length of the ovens is 30 feet (10 feet for each oven). The line speed (coating speed) was 60 FPM. The coat weight of the primer coating is about 1.9 g/m$^2$.

An anti-static coating is formed as follows: 8.16 kg of water, 0.09 kg of VERSA TL 502, 2.25 kg of MICRAL 1440 and 4.50 kg of PLIOLITE WR-D were mixed together for 30 minutes to form an anti-static coating composition.

The anti-static coating was applied to the primer clear PET base film (0.92 mil., ICI) with a #6 Mayer rod as the conditions mentioned above for the primer coating. The coat weight and the resistivity of the anti-static coating are 2.8 g/m$^2$ and $1.6 \times 10^{11}$ Ω/SQ, respectively.

An adhesive was formed from the following: 0.15 kg of XAMA-7, 2.7 kg of water and 12.15 kg of ROBOND PS-20 were mixed together for 40 minutes to form a clear adhesive. The adhesive coating was applied to the primered PET base film with a #16 Mayer rod and same conditions for the primer coating, except that the line speed was 100 FPM. The coat weight for the adhesive coating is about 9.0 g/m$^2$.

EXAMPLE 18

An opaque PSA stripe was formed in the same way as that described in Example 17, but with a different adhesive composition. The adhesive was formed as follows: 0.075 kg of XAMA-7, 2.70 kg of water and 12.225 kg of ROBOND PS-20 were mixed together for 30 minutes to form the adhesive. The coat weight of the adhesive coating is 9.0 g/m,.

EXAMPLE 19

An opaque PSA stripe was formed in the same way as described in Example 17, but with higher line speeds for the primer coating and the anti-static coating, and with a different adhesive composition. The line speeds for the primer and anti-static coatings are both 100 FPM. The adhesive was formed as the following: 0.03 kg of XAMA-7, 2.745 kg of water and 12.225 kg of ROBOND PS-20 were mixed together for 30 minutes to form the adhesive. The coating weight of the adhesive coating is 9.2 g/m$^2$.

EXAMPLE 20

Figure 4:
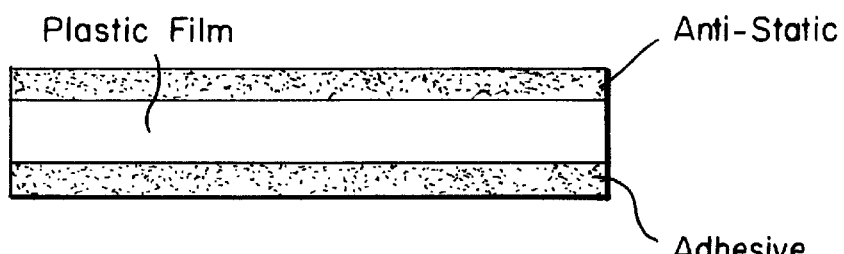
FIG. 4 provides a schematic diagram of an opaque pressure sensitive stripe with an anti-static coating on one side of the polymeric base sheet, and a pressure sensitive adhesive on another side of the polymeric base sheet.

An opaque PSA tape article was constructed having the structure shown in FIG. 4. The plastic film is an opaque PET film (0.92 mil, ICI). The anti-static coating was formed as follows: 54.4 g of water, 0.6 g of VERSA TL 502, 10.0 g of MICRAL 1440 and 35 g of PLIOLITE WR-D were mixed together for 30 minutes to form the anti-static coating. The anti-static coating was coated onto the PET film with a #6 Mayer rod and dried in an oven at 250° F. for 30 seconds. The coat weight and the resistivity of the coating are listed in Table 2.

The adhesive coating has the same composition as in Example 18. The PET with anti-static coating was coated with the adhesive coating by using a #16 Mayer rod. The coating was dried in an oven at 250° F. for 30 seconds.

The PSA sheet was cut into 0.385 inch wide stripes which were laminated onto transparent sheets. These sheets were imaged in a XEROX 5760 color copier. All five sheets were imaged well without jams. The imaging test results are also listed in Table 2.

EXAMPLE 21

An opaque PSA stripe was formed in the same way as described in Example 20, but with the following anti-static composition: 54.4 g of water, 0.3 g of VERSA TL 502, 15.0 g of MICRAL 1440 and 30.3 g of PLIOLITE WR-D. The resistivity of the anti-static coating and the imaging test results are listed in Table 2.

EXAMPLE 22

An opaque PSA stripe was formed in the same way as described in Example 20, but with the following anti-static coating composition: 54.4 g of water, 0.3 g of VERSA TL 502, 10.0 g of MICRAL 1440 and 35.3 g of PLIOLITE WR-D. The resistivity of the anti-static coating and the imaging test results are listed in Table 2.

EXAMPLE 23

An opaque PSA stripe was formed in the same way as described in Example 20, but with the following anti-static coating composition: 54.4 g of water, 1.0 g of VERSA TL 502, 15.0 g of MICRAL 1440 and 34.8 g of PLIOLITE WR-D. The resistivity of the anti-static coating and the imaging test results are listed in Table 2.

EXAMPLE 24

An opaque PSA stripe was formed in the same way as in Example 20, but with the following anti-static coating composition: 54.4 g of water, 0.6 g of VERSA TL 502, 18.0 g of MICRAL 1440 and 27.0 g of PLIOLITE WR-D. The resistivity of the anti-static coating and the imaging test results are listed in Table 2.

EXAMPLE 25

An opaque PSA stripe was formed in the same way as described in Example 20, but with the following anti-static coating composition: 54.4 g of water, 0.6 g of VERSA TL 502, 5.0 g of MICRAL 1440 and 40.0 g of PLIOLITE WR-D. The resistivity of the anti-static coating and the imaging test results are listed in Table 2

EXAMPLE 26

An opaque PSA stripe was formed in the same way as in Example 20, but with the following anti-static coating composition: 54.4 g of water, 0.3 g of VERSA TL 502, 5.3 g of MICRAL 1440 and 40.0 g of PLIOLITE WR-D. The resistivity of the anti-static coating and the imaging test results are listed in Table 2.

TABLE 2

Compositions and Resistivities of Anti-Static Coatings

| Composition | Ex. 20 | Ex. 21 | Ex. 22 | Ex. 23 | Ex. 24 | Ex. 25 | Ex. 26 |
|---|---|---|---|---|---|---|---|
| Water | 54.4 | 54.4 | 54.4 | 54.4 | 54.4 | 54.4 | 54.4 |
| VERSA TL 502 | 0.6 | 0.3 | 0.3 | 1.0 | 0.6 | 0.6 | 0.3 |
| MICRAL 1440 | 10.0 | 15.0 | 10.0 | 15.0 | 18.0 | 5.0 | 5.3 |
| PLIOLITE WR-D | 35.0 | 30.3 | 35.3 | 34.8 | 27.0 | 40.0 | 40.0 |
| Resistivity ($\Omega$/SQ) | $2 \times 10^{10}$ | $4 \times 10^{10}$ | $1 \times 10^{10}$ | $6 \times 10^{10}$ | $1.6 \times 10^{10}$ | $2 \times 10^{10}$ | $1.3 \times 10^{10}$ |
| Coating Weight (g/m$^2$) | 2.0 | 2.0 | 2.0 | 2.0 | 2.0 | 2.0 | 2.0 |
| Imaging* | well | well | well | well | well | well | jams |

*Five transparent sheets with the pressure sensitive adhesive stripes were imaged well in a XEROX 5760 color copier and all of them went through the copier without jams.

EXAMPLE 27

An opaque PSA tape article was constructed having the structure shown in FIG. 4. The plastic film is an opaque PET film (0.92 mil, ICI). The anti-static coating was formed as follows: 54.4 g of water, 0.6 g of VERSA TL 502, 15.0 g of MICRAL 1440 and 30 g of Piolite WR-D were mixed together for 30 minutes to form the anti-static coating composition. The anti-static coating mixture was coated onto the PET film with a #6 Mayer rod at 100 FPM and dried in three ovens at 275, 275 and 250° F. The coat weight and the resistivity of the coating are 4.4 GSM and $1 \times 10^9 \Omega$/SQ, respectively.

The adhesive coating has the following composition: 2.655 kg of water, 0.12 kg of XAMA-7 and 12.225 kg of ACRONAL 3432. The PET coated with the anti-static coating was coated with the adhesive coating by using a #22 Mayer rod at 100 FPM and dried in the ovens with same condition mentioned above for the anti-static coating.

The PSA sheet was cut into 0.385 inch wide stripes which were laminated onto transparent sheets. These sheets were imaged in a XEROX 5760 color copier.

What is claimed is:
1. A pressure-sensitive adhesive tape, comprising:
    (a) a polymeric base film;
    (b) an anti-static composition comprising polystyrene sulfonic acid and alumina trihydrate coated on one surface of the base film; and
    (c) a pressure-sensitive adhesive coated on a surface of the base film opposite to the surface coated with the anti-static composition;
    wherein the pressure-sensitive adhesive tape has an opacity greater than 70%.
2. The pressure-sensitive tape according to claim 1, wherein the polymeric base film comprises a polymer selected from the group consisting of polyolefins, polybutylene, polystyrene, polyester, polymethylmethacrylate, cellulose acetate, polyvinyl chloride, polyvinylidene fluoride, polyamide, and mixtures thereof.

3. The pressure-sensitive tape according to claim 2, wherein the polymeric base film has a thickness in the range of about 0.4 mil to about 1.4 mil.

4. The pressure-sensitive tape according to claim 1, wherein the polymeric base film further comprises an adhesion-promoting, layer coated on at least one surface of the film.

5. The pressure-sensitive tape according to claim 4, wherein the adhesion-promoting layer comprises polyurethane.

6. The pressure-sensitive tape according to claim 1, wherein the adhesive comprises pigment.

7. The pressure-sensitive tape according to claim 1, wherein the anti-static composition further comprises an acrylic resin.

* * * * *